United States Patent
Loghmani et al.

(10) Patent No.: US 11,960,553 B1
(45) Date of Patent: Apr. 16, 2024

(54) UNSUPERVISED USER SEGMENT DISCOVERY SYSTEM

(71) Applicant: Content Square SAS, Paris (FR)

(72) Inventors: Mohammad Reza Loghmani, Paris (FR); Mouad Antari, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 18/383,534

(22) Filed: Oct. 25, 2023

Related U.S. Application Data

(63) Continuation-in-part of application No. 18/210,206, filed on Jun. 15, 2023, which is a continuation of application No. 18/131,173, filed on Apr. 5, 2023, now abandoned, which is a continuation of application No. 17/977,392, filed on Oct. 31, 2022, now Pat. No. 11,625,442.

(51) Int. Cl.
*G06F 16/951* (2019.01)
*G06F 16/904* (2019.01)
*G06F 16/906* (2019.01)
*G06F 40/30* (2020.01)

(52) U.S. Cl.
CPC .......... *G06F 16/951* (2019.01); *G06F 16/904* (2019.01); *G06F 16/906* (2019.01); *G06F 40/30* (2020.01)

(58) Field of Classification Search
CPC .... G06F 16/951; G06F 16/904; G06F 16/906; G06F 40/30
USPC ........................................................ 707/706
See application file for complete search history.

(56) References Cited

U.S. PATENT DOCUMENTS

| | | | |
|---|---|---|---|
| 11,082,509 B1 * | 8/2021 | Bandari | G06N 20/20 |
| 11,625,442 B1 | 4/2023 | Loghmani et al. | |
| 2006/0015504 A1 | 1/2006 | Yu et al. | |
| 2019/0124167 A1 | 4/2019 | Reshef et al. | |
| 2022/0027430 A1 | 1/2022 | Wang et al. | |

OTHER PUBLICATIONS

"U.S. Appl. No. 17/977,392, Corrected Notice of Allowability dated Mar. 1, 2023", 6 pgs.
"U.S. Appl. No. 17/977,392, Notice of Allowance dated Feb. 10, 2023", 14 pgs.
"U.S. Appl. No. 18/210,206, Non Final Office Action dated Aug. 17, 2023".
"U.S. Appl. No. 18/210,206, Response filed Sep. 28, 2023 to Non Final Office Action dated Aug. 17, 2023", 7 pgs.

(Continued)

*Primary Examiner* — Michael Pham
(74) *Attorney, Agent, or Firm* — Schwegman Lundberg & Woessner, P.A.

(57) ABSTRACT

A computing system generates and a plurality of clusters by clustering the session representations based on similarity between session representations, the plurality of clusters comprising an optimal number of clusters based on key performance indicators corresponding to each cluster of the plurality of clusters. The computing system determines a medoid of each of the plurality of clusters, and then for each session representation generated for each of a second plurality of sessions, the computing system computes a distance between the session representation and each medoid to determine a nearest medoid and assigns the session representation to a cluster associated with the nearest medoid.

20 Claims, 8 Drawing Sheets

(56) References Cited

OTHER PUBLICATIONS

Diep, N. N., et al., "An Unsupervised Method for Web User Interest Analysis", 6th NAFOSTED Conference on Information and Computer Science (NICS), Hanoi, Vietnam, (2019), 27-32.
U.S. Appl. No. 17/977,392 U.S. Pat. No. 11,625,442, filed Oct. 31, 2022, Unsupervised User Segment Discovery System.
U.S. Appl. No. 18/131,173, filed Apr. 5, 2023, Unsupervised User Segment Discovery System.
U.S. Appl. No. 18/210,206, filed Jun. 15, 2023, Unsupervised User Segment Discovery System.
"U.S. Appl. No. 18/210,206, Non Final Office Action mailed Nov. 2, 2023", 11 pgs.
"U.S. Appl. No. 18/210,206, Response filed Nov. 21, 2023 to Non Final Office Action mailed Nov. 2, 2023", 7 pgs.
"U.S. Appl. No. 18/210,206, Notice of Allowance mailed Dec. 26, 2023", 12 pgs.

* cited by examiner

UNSUPERVISED USER SEGMENT DISCOVERY SYSTEM

CLAIM OF PRIORITY

This Application is a Continuation in part of U.S. application Ser. No. 18/210,206, filed Jun. 15, 2023, which is a continuation of U.S. application Ser. No. 18/131,173, filed Apr. 5, 2023, which is a continuation of U.S. application Ser. No. 17/977,392, filed Oct. 31, 2022, each of which is hereby incorporated by reference in its entirety.

BACKGROUND

The Internet is a collection of disparate computer systems which use a common protocol to communicate with each other. A common use of the Internet is to access websites. Websites are typically stored on a server and remotely accessed by a computing device over the Internet using a web browser.

To increase user visitations and revenue, websites have become very sophisticated. Websites typically include webpages that provide information to users, advertise products or services to users and/or provide site search functions for users. A problem for website owners is how to determine how successful the website is, for example, whether the informational or other needs of users are met and whether the users are purchasing goods and services advertised on their site. Techniques have been developed for recording user activity (events such as URLs accessed and the like) on websites to generate event streams and analytics to determine the success of a website, among other things. Discovering important patterns, however, is very challenging.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
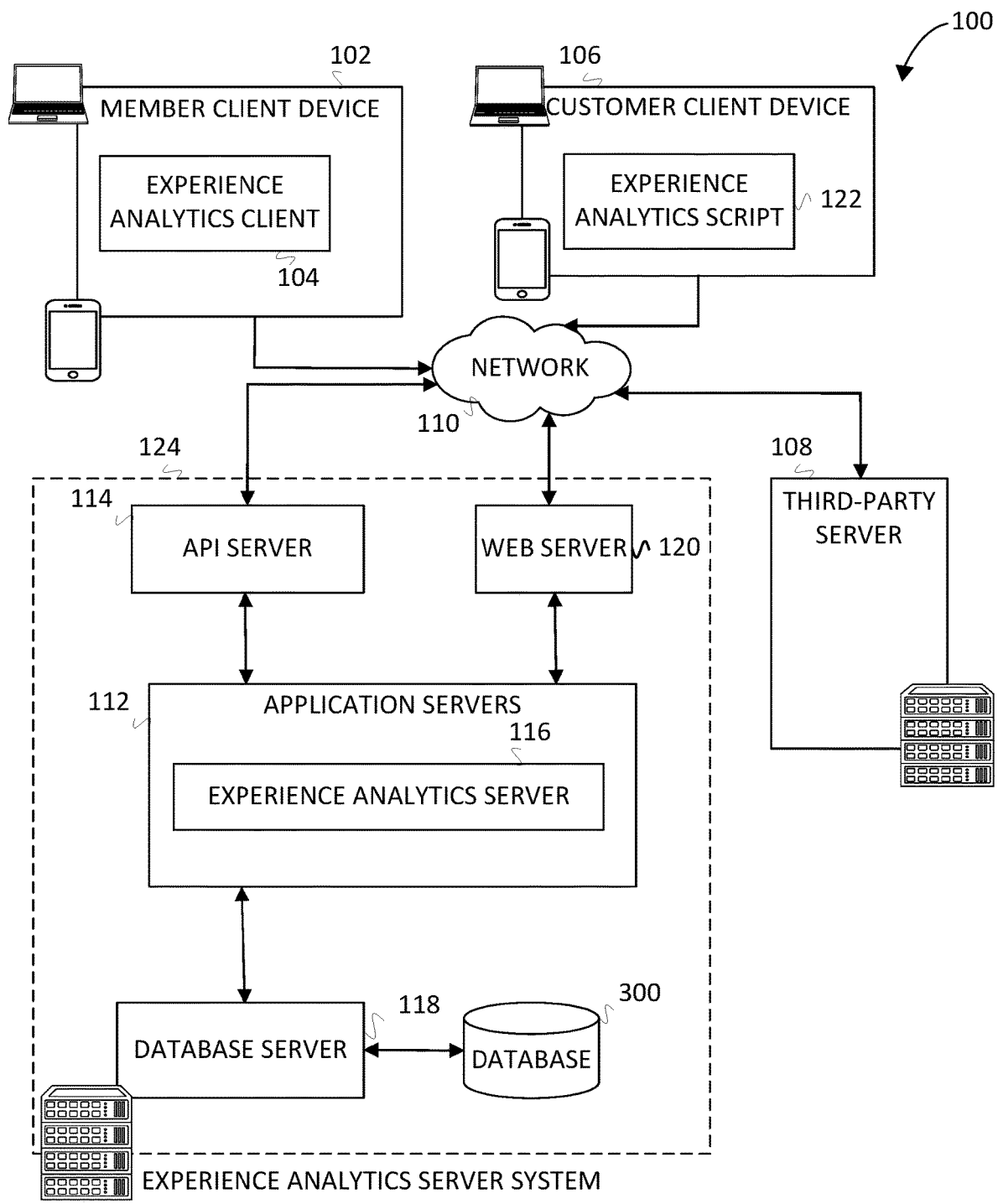
FIG. 1 is a diagrammatic representation of a networked environment in which the present disclosure may be deployed, in accordance with some examples.

As explained above, discovering important patterns of user activity on websites is very challenging since key patterns are unknown. For example, each user may navigate a particular website in a variety of ways and often in ways not anticipated during design of the website. Further, key stakeholders for a website do not know where to look or how to identify patterns and usage. Accordingly, technical challenges in discovering patterns of user activity include how to identify unknown key patterns and usage, how to evaluate the key patterns and usage, and how to generate a description for what each pattern and usage represents.

Embodiments described herein address these and other technical issues by providing an unsupervised user segment discovery system to discover important segments and patterns within an analyzed population for which no labels or ground truths are known. Further, the unsupervised user segment discovery system establishes key performance indicators to assess the value of segments discovered. Finally, the unsupervised user segment discovery system automatically generates a description for what each segment represents.

For example, a computing system accesses a plurality of sessions corresponding to a website comprising a plurality of webpages, each session indicating an order through which a user navigated through the plurality of webpages during the session and generates, for each of the plurality of sessions, a session representation indicating the order through which the user navigated through the plurality of webpages during the session. The computing system generates, for each pair of session representations, a score indicating how similar the session representations in each pair are to each other. The computing system further generates a plurality of clusters by clustering the session representations based on the score for each pair of session representations, determines an optimal number of clusters based on key performance indicators corresponding to each cluster of the plurality of clusters, and generates a natural language description for each cluster of the optimal number of clusters based on the key performance indicators associated with each cluster.

In other examples, the computing system uses a less computationally heavy process to add new session representations to the plurality of clusters. For example, the computing system determines a medoid of each of the plurality of clusters, and then for each session representation generated for each of a second plurality of sessions, the computing system computes a distance between the session representation and each medoid to determine a nearest medoid. The computing system assigns the session representation to a cluster associated with the nearest medoid. In one example, the computing system assigns the session representation to a cluster associated with the nearest medoid, if the distance between the session and the nearest medoid is lower than a given threshold. If the distance between the session and the nearest medoid is higher than the given threshold, the session representation is left unassigned.

Networked Computing Environment

FIG. 1 is a block diagram showing an example experience analytics system 100 that analyzes and quantifies the user experience of users navigating a website, mobile websites, and applications. The experience analytics system 100 can include multiple instances of a member client device 102, multiple instances of a customer client device 106, and multiple instances of a third-party server 108.

The member client device 102 is associated with a client (also referred to herein as an "entity") of the experience analytics system 100, where the client has a website hosted on the client's third-party server 108. For example, the client can be a retail store that has an online retail website that is hosted on a third-party server 108. An agent of the client, such as a web master or an employee, can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications, such as Chrome or Safari. The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data (also referred to here as "events") including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, and so forth. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124 includes functions, such as commands to invoke functions, as well as payload data, such as website data, texts reporting errors, insights, merchandising information, adaptability information, images, graphs providing visualizations of experience analytics, session replay videos, and zoning and overlays to be applied on the website.

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning, and overlays to be applied on the website, and so forth.

The application servers 112 host a number of server applications and subsystems, including, for example, an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, and so forth, received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning, and overlays to be applied on the website, and so forth. Other processor and memory intensive processing of data may also be performed server-side by the experience analytics server 116, in view of the hardware requirements for such processing.

System Architecture

Figure 2:
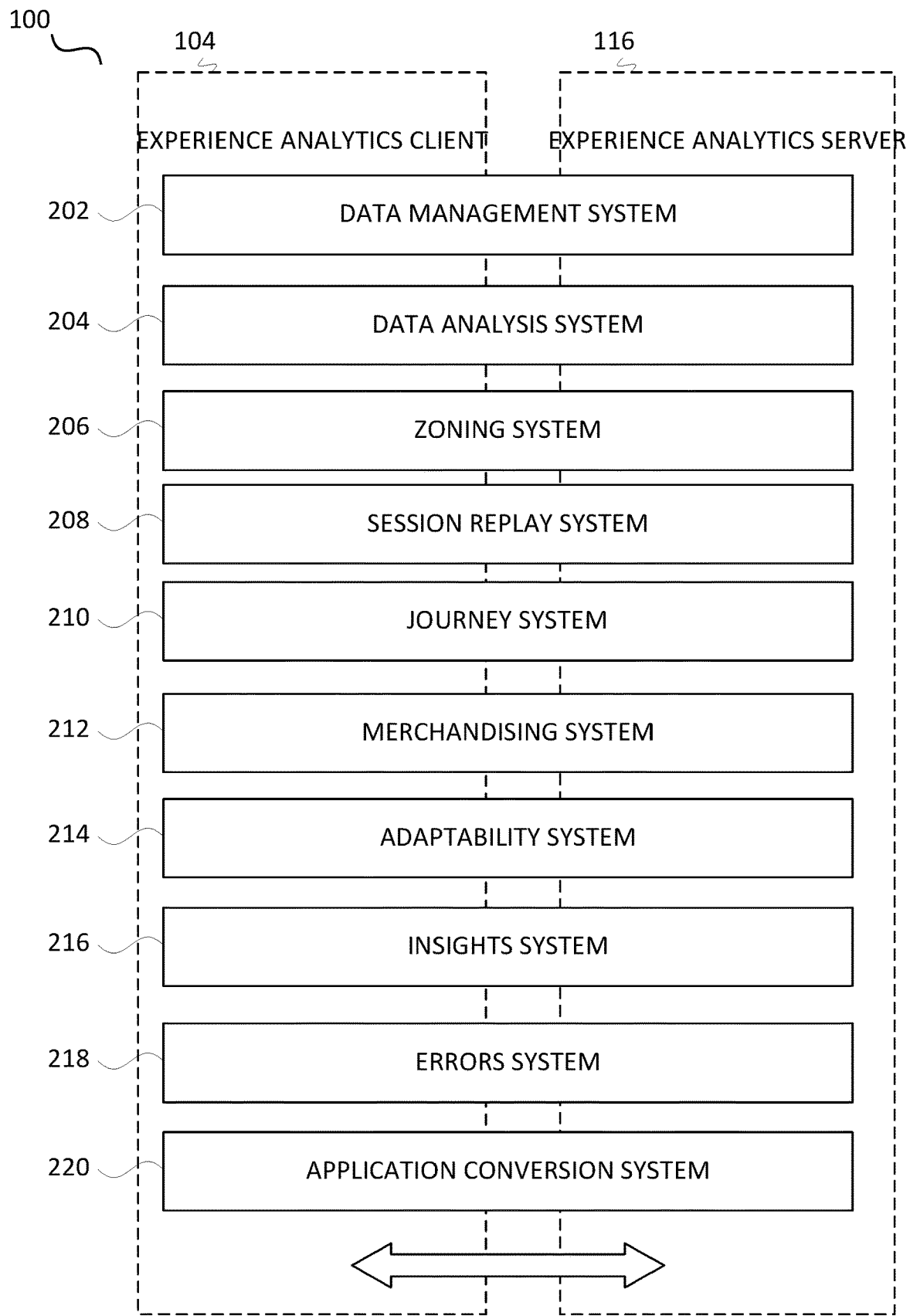
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element displayed on the website (e.g., an icon, a text link). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter). The session replay interface allows the client via the member client device 102 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website and illustrates the visited pages and the order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on merchandise to be promoted on the website, optimization of sales performance, items in the client's product catalog on a granular level, competitor pricing, and the like. The merchandising interface can, for example, comprise graphical data visualization pertaining to product opportunities, category, brand performance, and so forth. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 to surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, and so forth. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey on the website and the page that adversely affects (e.g., causes frustration for) the users on customer client devices 106 who are visiting the client's website. The errors can also include causes of looping behaviors by the users, in-page issues such as unresponsive calls to action and slow loading pages. The errors can be displayed by the member client devices 102 via the experience analytics client 104 on a dashboard of a user interface, as a pop-up element, as a separate panel, and the like. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

Data Architecture

Figure 3:
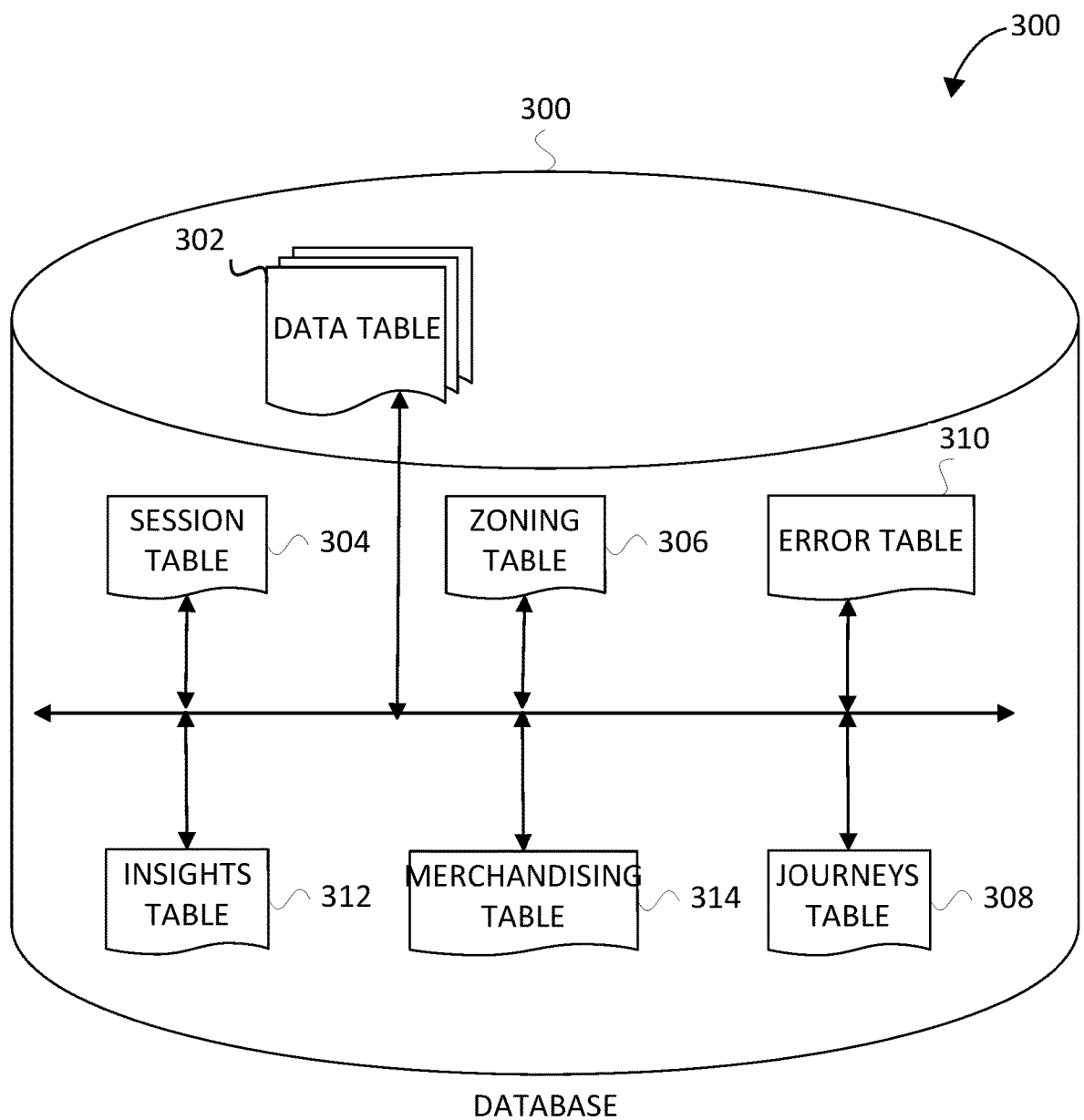
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, and so forth. The data table 302 can also store data tags and results of data science and data engineering processes on the data. The data table 302 can also store information such as the font, the images, the videos, the native scripts in the website or applications, and so forth.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights system 216.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities the performance of the products based on the zones in the website or application, and so forth.

Process

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, and so forth. The operations of methods may be performed in whole or in part, may be performed in conjunction with some or all of the operations in other methods, and may be performed by any number of different systems, such as the systems described herein, or any portion thereof, such as a processor included in any of the systems.

Figure 4:
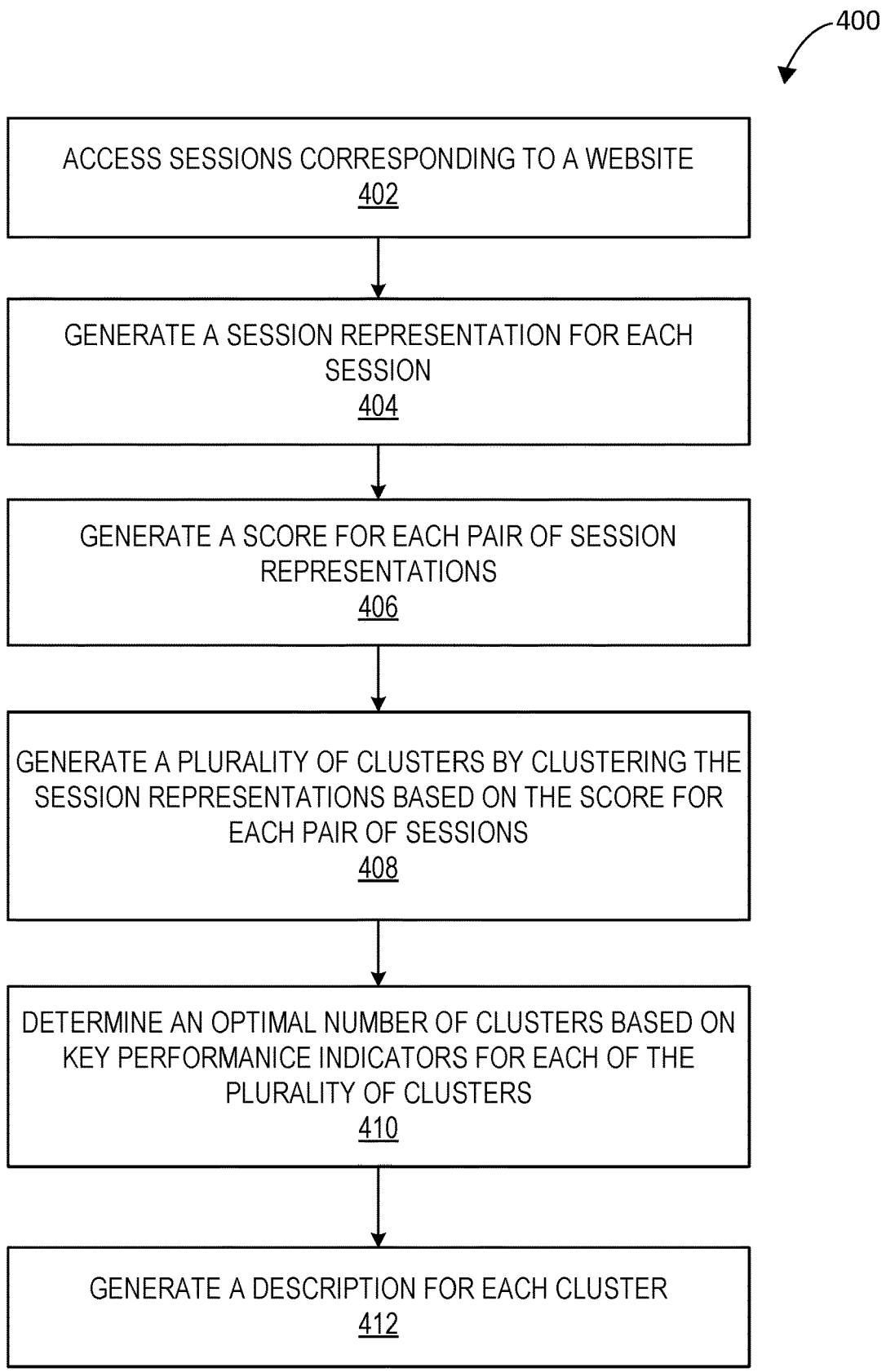
FIG. 4 is a flowchart for a process, in accordance with some examples.

FIG. 4 is a schematic diagram illustrating a process 400. In operation 402, a computing system (e.g., experience analytics server system 124 or experience analytics server 116) accesses a plurality of sessions corresponding to a website. The website comprises a plurality of webpages. Each session indicates an order through which a user navigated through the plurality of webpages during the session. This is also referred to a "journey" above with respect to the journey system 210 related to how visitors to a client's website progress through the client's website, page-by-page, from entry onto the website to the exit (e.g., in a session). In one example a session is defined within a time frame where any activity on the website by a user within thirty minutes from the last interaction will still be recorded in the same session (e.g., when a user leaves and returns to the website within thirty minutes the activity by the user is kept within the same session). The computing system accesses the plurality of sessions from one or more databases, such as via the journey's table 308 of database 300.

In operation 404, the computing system generates, for each of the plurality of sessions, a session representation indicating the order through which the user navigated through the plurality of webpages during the session. In order to compare a set of sessions (e.g., user, customer, or visitor journeys), the representation of each session includes information about the pages visited in the session as well as the order of those visits (e.g., a sequential representation). In one example, the computing system schematizes each session as a single string, where each character represents a page category. In this example, the session representation is a string based on a semantic categorization of webpages.

Using an example of a session that began with a home page, then went to search results, product page, search results, category page, product page, cart, checkout, and then confirmation, this session can be represented as: HSPST-PRKC, where:
H=Home page
S=Search page
P=Product page
T=Category page
R=Cart
K=Checkout
C=Confirmation
It is to be understood that this is one example of categorization of webpages and that different or additional categorizations could be used in example embodiments described herein. Further, these categorizations can be uniform across all websites or can be specific to a particular website. Accordingly, any semantic categorization of webpages can be used in example embodiments.

The session representation is used to compare pairs of sessions. In operation 406, the computing system generates, for each pair of session representations, a score indicating how similar the session representations in each pair are to each other. In one example an edit distance, such as an affine gap distance or Levenshtein distance, is used which is a string distance that determines the minimal edit operations needed to make two strings the same. Each edit distance is characterized by the set of edit operations (e.g., insertion, deletion, character change, stating a gap) that it considers as well as the penalty associated with each operation. In one example, generating the score is based on a cost of a character change, a cost of insertion, a cost of deletion, and a cost of starting a gap.

In one example, the cost of a character change is higher than a cost of an insertion or deletion such that insertions and deletions are less penalized than character changes. Thus, it is estimated that the scenario of two sessions sharing a common sequence where in one of the sessions additional pages are visited at a certain point is closer (more similar) than two sessions sharing a common sequence but where in both sessions additional pages are visited, even if it is at the same moment. For example, the distance between the pair ("abcdddabc", "abcabc") where the first sequence has and additional "ddd" pages that were visited, must be smaller (more similar) than the pair ("abcdddabc", "abceeeabc"), that had an additional "ddd" pages in the first sequence and an additional "eee" pages in the second sequence that were visited.

In one example, the more subsequent insertions and deletions, the further the strings must be. While comparing two sessions that had the same journey but one of them visited more page categories in between the common ones, the distance grows the more "interruptions" the common sequence has. For example, the distance between the pair ("abcddddabc", "abcabc") must be smaller (more similar) than the pair ("abddcaddbc", "abcabc").

Based on the two above examples, differences between pairs can be penalized as follows:
cost of character change=1;
cost of insertion/deletion=0.5;
cost of starting a gap=0.5.
For example, when comparing "Alexander Johansson" with "Alax Jso" we will have:
"Alexander Johansson"
"Alax J so"
Thus: 1*1 (character change)+0.5*11 (insertion/deletion)+ 0.5*3 (consecutive insertions/deletions)=8. Accordingly, the score of this pair is 8. It is to be understood that additional or different penalties can be used in example embodiments. Further, an affine gap distance was used in this example, it is to be understood that other algorithms to determine a distance between strings can be used in example embodiments. In this example, the larger the score, the more different the session representations are in the pair.

In operation 408, the computing system generates a plurality of clusters by clustering the session representations based on the score for each pair of session representations. Any clustering algorithm can be used in example embodiments to generate the plurality of clusters based on the score for each pair of session representations. For example, the Hierarchical Clustering algorithm can be used in some examples. The Hierarchical Clustering algorithm consists on clustering samples by iterations, where each iteration merges the two closest clusters (e.g., based on score), beginning by considering each single sample as a (singleton) cluster. For example, to cluster N samples into n different clusters, the algorithm needs (N-n) iterations since each one is decrementing the number of clusters by 1.

In one example, the computing system uses a predefined range (e.g., 5-40) to generate the plurality of clusters to consider for an optimal number of clusters. For example, the computing system uses the Hierarchical Clustering algorithm to generate 40 clusters, 39 clusters, 38 clusters, and so forth down to 5 clusters. Each of these numbers of clusters (e.g., 40, 39, 38 . . . 5) are then considered to determine an optimal number of clusters.

In operation 410, the computing system determines an optimal number of clusters based on key performance indicators corresponding to each cluster of the plurality of clusters. Key performance indicators are used to evaluate the clusters or segments. Standard approaches for selecting a number of clusters, like silhouette scoring, lead to trivial results (e.g., only two clusters) and also do not take into account the goal of clustering to find groups of sessions (e.g., web journeys) that differ from each other based on key performance indicators specific to sessions. Example embodiments define and utilize a custom index (score) that leverages the evaluation key performance indicators to select the optimal number of clusters for a given dataset.

In one example, the key performance indicators comprise project-agnostic key performance indicators and/or project-specific key performance indicators. Some examples of project-agnostic key performance indicators are a session-level interaction time (e.g., time actually interacting such as scrolling, clicking links, hovering over a button, etc.) with each page category, a conversion rate, a frustration score, and so forth. A conversion rate is a percentage of users that make a purchase, and a frustration score is based on factors such as errors, multiple interactions with the same elements, excessive hovers, lack of clicks on a page, loading time, and so forth. Some examples of project-specific key performance indicators are goals identified by an entity associated with a website, such as a click on add to cart, visiting a specified page, visiting a checkout cart page, and so forth. For instance, an entity associated with the website can set one or more goals on a platform hosted by the experience analytics server system 124. In one example, the topmost used goals are selected for the project-specific key performance indicators. In one example, coplanar key performance indicators are discarded (e.g., key performance indicators with high correlation between each other), keeping only one representative of each group of coplanar key performance indicators.

To generate the optimal number of clusters, the computing system first computes, for each pair of clusters and a key performance indicator of a plurality of key performance indicators, a value indicating a comparison of distributions of the key performance indicator between each cluster in the pair. For example, for each couple (cluster, key performance indicator (KPI)), the computing system computes an index based on the p-values of the two sided z-test to compare the distributions of the KPI between the cluster of interest and all the other clusters. For instance, let $p_{kpi_k,ij}$ be the p-value of the comparison of $kpi_k$ between clusters i and j.

The computing system next computes, for each cluster, a key performance indicator cluster index for each key performance indicator. The key performance indicator cluster index indicates how a cluster corresponds to each key performance indicator. In one example, the formula of the index of $cluster_i$ regarding the $kpi_k$ is the following:

$$\text{index}_{kpi_k}(\text{cluster}_i) = \text{geoMean}_{1 \leq j \leq n; j \neq i}(-\log_{10}(p_{kpi_k,ij}))$$

The purpose of this formula is to measure how good a cluster is with respect to a specific key performance indicator. For example, a good cluster with respect to a specific key performance indicator is a cluster with values according to the specific key performance indicator that are different from values of other clusters according to the same specific key performance indicator. The use of $-\log_{10}$ is meant to transform the range of p-values from [0,1] to all positive numbers, as well as having the biggest score referring to the best clusters. A geometric mean is also used instead of a standard average to penalize higher numbers of clusters.

Next, the computing system computes, for each cluster, multiple key performance indicator cluster indices based on the key performance indicator cluster index for each key performance indicator. To consider all evaluation key performance indicators at once, the computing system averages $\text{index}_{kpi_k}(\text{cluster}_i)$ over all considered key performance indicators:

$$\text{index}(\text{cluter}_i) = \text{mean}_k(\text{index}_{kpi_k}(\text{cluster}_i))$$

Finally, the computing system computes an overall index value based on a sum of the multiple key performance indicators cluster index for each cluster. For example, the computing system sums over all clusters to obtain a single scalar representing the index of a clustering result:

$$\text{index}(N_{clusters}) = \sum_{i=1}^{N_{clusters}} \text{index}(\text{cluster}_i)$$

The computing system next selects the optimal number of clusters based on the overall index value. For example, the computing system computes scores for a predefined number of clusters (e.g., 5-40) by computing a score for each number of clusters in a predefined range, the score indicating an increase in value for a given number of clusters from the previous number of clusters, using the overall index value. The computing system identifies a maximum score of the computed scores and selects a number of clusters with the maximum score as the optimal number of clusters.

By increasing the number of clusters, an improvement of the index can be realized since there will always be some difference in the key performance index values of new clusters with respect to the others. The ultimate goal of this metric is to focus on the best number of clusters that not only have a high index, but also improves the clustering the most with respect to the previous number of clusters. The improvement from $N_{clusters}-1$ to $N_{clusters}$ is quantified as:

$$\text{score}(N_{clusters}) = \frac{\text{index}(N_{clusters})^\lambda}{\text{index}(N_{clusters} - 1)}$$

The ratio $$\frac{\text{index}(N_{clusters})}{\text{index}(N_{clusters} - 1)}$$

quantifies the improvement relative to the value of the index and $\lambda$ can be thought of as a weight that allows us to control the importance of the numerator and the denominator. In one example, $$\lambda = \frac{3}{2}$$

is used to give slightly more importance to the numerator. Often it is more useful to explore different sets of clusters. To provide a set of good values for the number of clusters the computing system, as explained above, computes all scores for a predefined range, e.g., $N_{clusters} \in [5,40]$, and identifies the maximum score.

The computing system then generates explanations and interpretations for each cluster of the optimal number of clusters, such as by generating natural language descriptions of each cluster, identifying a longest common subsequence shared between session representations in each cluster, and identifying one or more session representations for each cluster as prototypical session representation of the cluster. These are described further in the following paragraphs.

In operation 412, the computing system generates a natural language description for each cluster of the optimal of clusters based on the key performance indicators associated with each cluster. The computing system can also generate a comparison of the key performance indicator for the cluster compared to all clusters. The description highlights how the cluster of interest differs from the overall traffic. To do so, the computing system leverages the evaluation key performance indicators and uses the z-test to determine how much the distribution of each key performance indicator differs between a cluster of interest and the general traffic. More specifically, computing system uses the two sided z-test, which is a statistical test, to verify whether two sets of samples are probably taken from the same distribution or not. The p-value of the test represents the probability that they come from the same distribution. So, the computing system computes the p-values of the two sided z-test to compare, for each key performance indicator, the distribution of the values within the cluster versus the values on the whole dataset. And, for each cluster, the computing system takes the key performance indicators that have the least n-least (n-best) p-values. Note that the conversion rate key performance indicator can be treated differently from other key performance indicators by showing the ratio of the conversion rate of the cluster and the average conversion rate in percentage. Some examples of a cluster description include the following:

The users of the sessions in the cluster 3:
interacted with the category "Category" less than the set of all users.
interacted with the category "Confirmation" less than the set of all uses.
interacted with the category "Brand_image" less than the set of all users.
reached the goal "Viewed_PIP" more than the set of all users.
interacted with the category "Search" less than the set of all users.
Has a conversion rate 36.35% smaller than the overall conversion rate.
Has as common subsequence(s):
→PPPPP (present on 96.29% of the sessions)
→SPPPP (present on 60.47% of the sessions)
→PPPPS (present on 47.37% of the sessions).

The above example of a cluster description includes the natural language descriptions (e.g., "interacted with the category "Category" less than the set of all users") and a list of common subsequences for the cluster. The computing system generates a longest common subsequence shared between session representation in each cluster and a percentage of sessions within the cluster that share the longest common subsequence. The longest common subsequence (LCS) is the longest sequence of characters that is shared between a group of strings, not necessarily subsequently, but in the same order. For example, consider the following three strings:
HSPTSPTTPRKRKC
HSTSPSSPTPS
HTPSPSPTPS
The LCS of these strings is SPSPTP (and not SPT).

The longest common subsequence highlights the pattern of visited page categories within the sessions of each cluster. In practice, it is very unlikely that all the sessions of a cluster share a non-trivial LCS. Thus, we focus on the most prominent common subsequences within subsets of each cluster, followed by the percentage of sessions within that cluster that share the subsequence.

In addition to the LCS, the computing system identifies, for each cluster, some real samples that are the most representative of all the cluster's sessions. For example, the computing system selects one or more session representations for each cluster as prototypical session representations for the cluster. To find these samples, the computing system searches for samples that have the least sum of distances with all the others that share the same cluster. These samples can be considered as the pseudo-centroids of the cluster.

In some examples, the above-described clustering process is run on a set of initial sessions or on a subset of a set of initial sessions. For example, the computing system accesses a plurality of sessions corresponding to a website for an initial time period. The computing system can then perform the operations described above to cluster the plurality of sessions and then when new sessions are available, the computing system can use a less-computationally heavy process to add the new sessions to the clusters generated with the initial plurality of sessions. Or the computing system can perform the operations described above to cluster only a subset of the initial plurality of sessions, and then use the less-computationally heavy process to add the rest of the sessions to the clusters generated using the subset of the initial plurality of sessions. In this case the computing system can also use the less computationally heavy process to add new sessions to the clusters that were generated using the subset of the initial plurality of sessions. The less computationally heavy process to add additional sessions to previously generated clusters is described with respect to FIG. 7 and FIG. 8.

Figure 7:
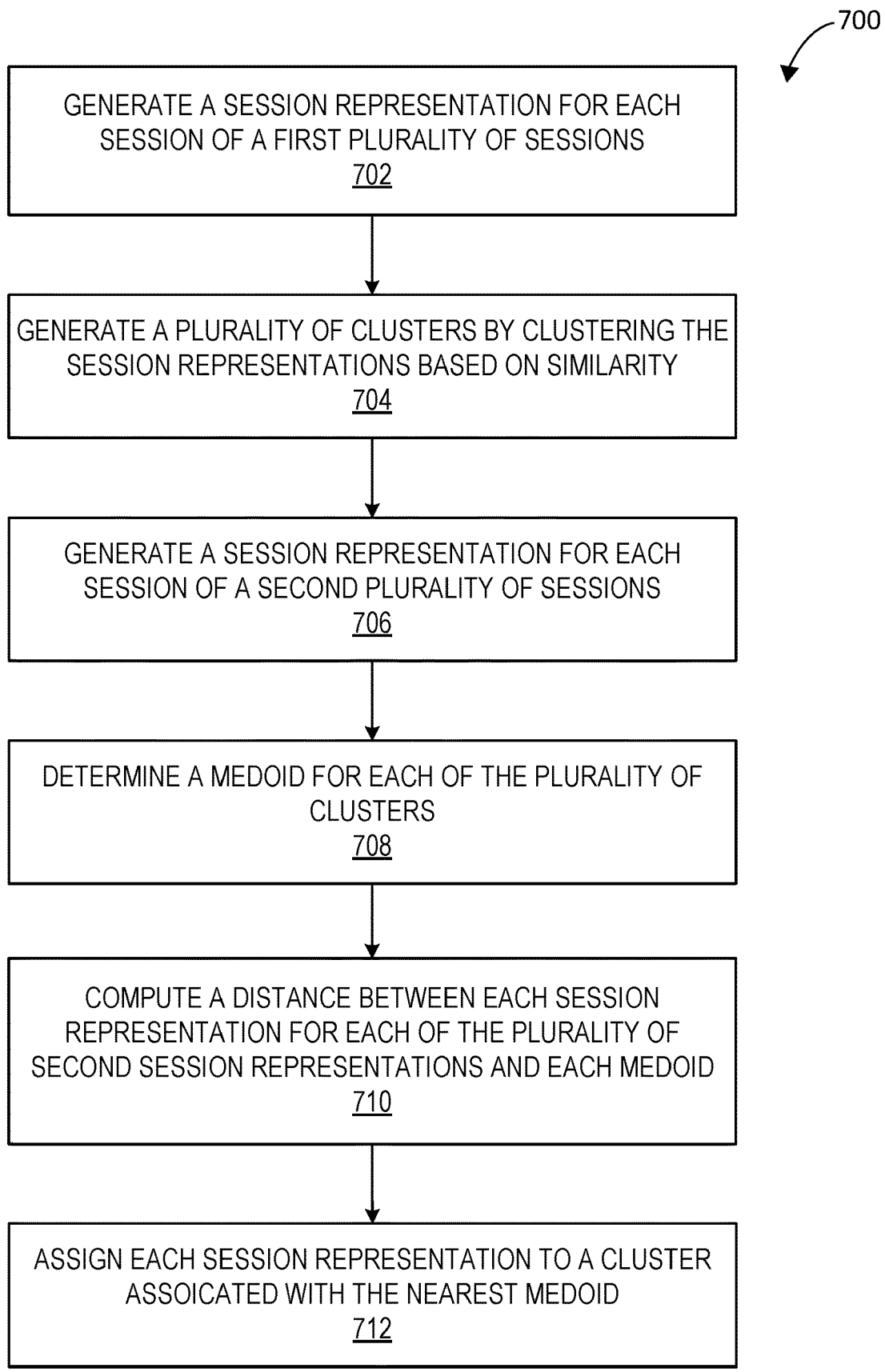
FIG. 7 is a flowchart for a process, in accordance with some examples.

FIG. 7 is a schematic diagram illustrating a process 700. As explained above, the computing system can use the above-described process for generating clusters. For instance, in operation 702 the computing system generates, for each of a first plurality of sessions, a session representation indicating an order through which a user navigated through a plurality of webpages during the session, as explained above with respect to operation 404. The first plurality of sessions can be an initial set of sessions, or it can be a subset of the initial set of sessions. In operation 704, the computing system generates a plurality of clusters by clustering the session representations based on similarity between session representations, the plurality of clusters comprising an optimal number of clusters based on key performance indicators corresponding to each cluster of the plurality of clusters, as also explained above with respect to operations 406-410.

In operation 706, the computing system generates, for each of a second plurality of sessions, a session representation indicating an order through which a user navigated through a plurality of webpages during the session. The second plurality of sessions can be a subset of the initial set of sessions. For example, the second plurality of sessions can be the rest of the sessions in the initial set of sessions, not including the first plurality of sessions. In other examples, the second plurality of sessions comprises new sessions generated after the first plurality of sessions was generated and after the plurality of clusters were generated.

Figure 8:
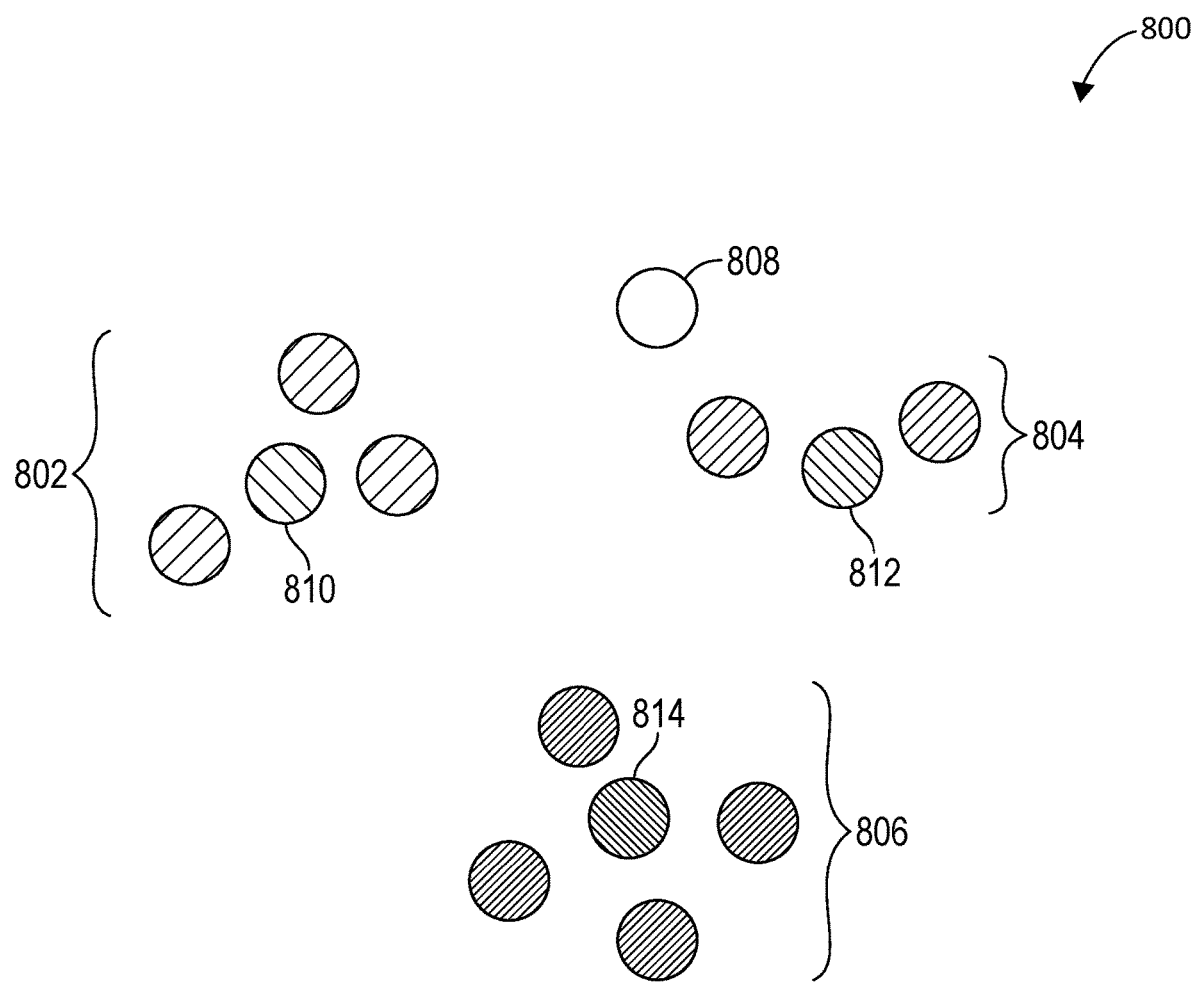
FIG. 8 is a diagram illustrating clusters, in accordance with some examples.

In operation 708, the computing system determines a medoid for each of the plurality of clusters. A medoid is a session representation that has the least sum distance with session representations in a respective cluster. For instance, the medoid is the most central session representation of its cluster. FIG. 8 illustrates three example clusters 802, 804 and 806 that each contain a number of session representations. The medoid for each cluster is shown as medoid 810 for cluster 802, medoid 812 for cluster 804 and medoid 814 for cluster 806.

Using the medoids for each cluster, the computing system can determine which cluster to assign each session representation of the second plurality of sessions. In operation 710, the computing system computes a distance between each session representation and each medoid to determine a nearest medoid for each session representation. In some examples the computing system computes the distance using any algorithm to determine distance, such as affine gap distance or Levenshtein distance. For example, the computing system computes a distance between a new session representation 808 and each medoid 810, 812 and 814, as shown in FIG. 8.

In operation 712, the computing system assigns each session representation to a cluster associated with the nearest medoid. For example, the computing system assigns new session representation 808 to cluster 804 since the distance between the new session representation 808 is closest to the medoid 812 of cluster 804.

In one example, the computing system assigns the session representation to a cluster associated with the nearest medoid, if the distance between the session and the nearest medoid is lower than a given threshold. If the distance between the session and the nearest medoid is higher than the given threshold, the session representation is left unassigned.

Thus, for each session representation generated for each of the second plurality of sessions, the computing system computes a distance between each session representation and each medoid to determine a nearest medoid for each session representation and then assigns the session representation to a cluster associated with the nearest medoid. This method can be used when the computing system has already clustered some data and has more data that it can assign to the existing clusters, instead of having to re-cluster all of the data anew.

Other methods, such as a mean strategy or nearest neighbor strategy can be used in examples described herein instead of using a medoid. However, the inventors determined that the mean strategy had a longer running time and less coherent results than the medoid strategy. Similarly, the nearest neighbor strategy took significant time on a typical data set containing one week of data. The inventors found that the medoid strategy can run on a data set of about two million sessions in one minute and with coherent results.

Machine Architecture

Figure 5:
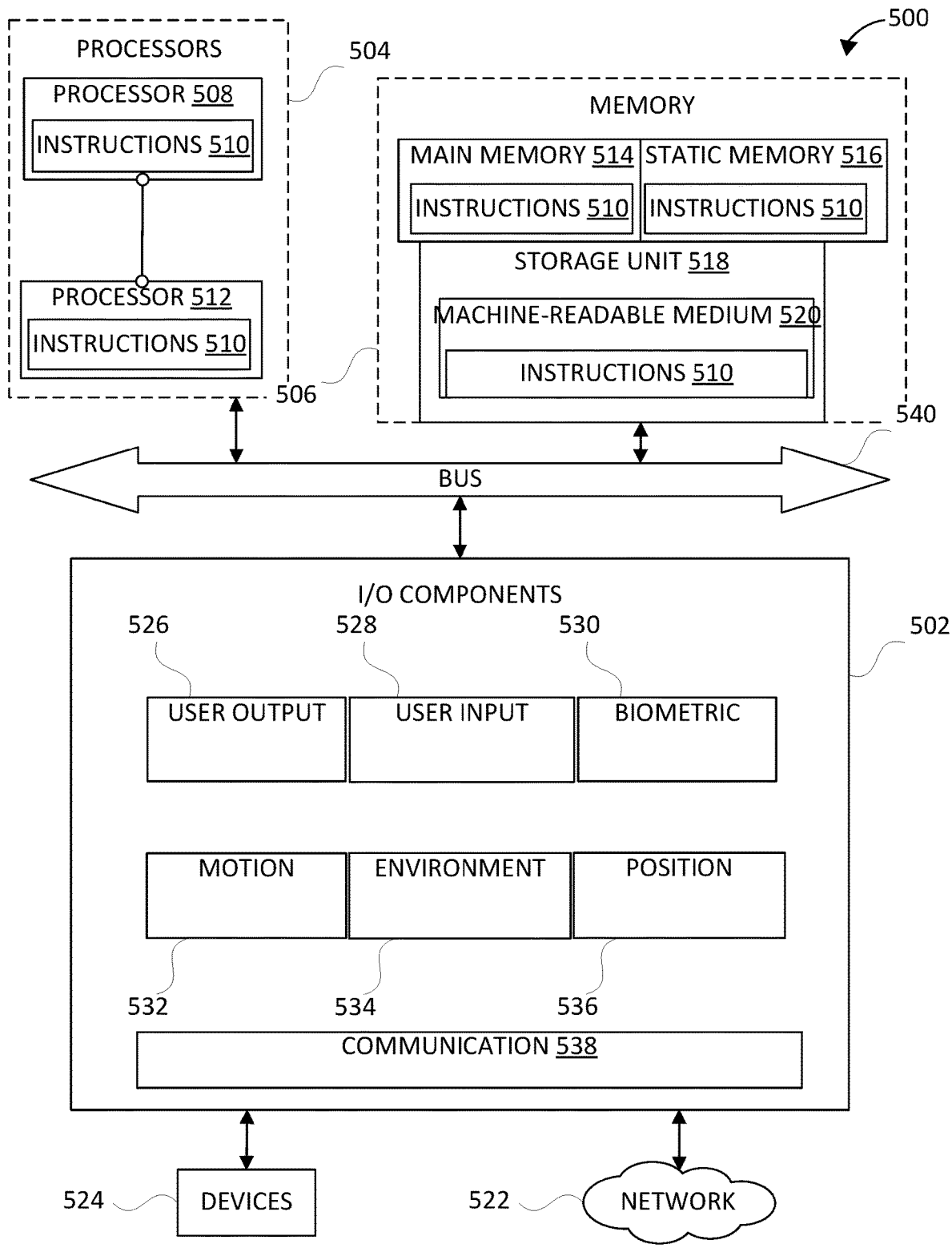
FIG. 5 is a diagrammatic representation of a machine in the form of a computer system within which a set of instructions may be executed for causing the machine to perform any one or more of the methodologies discussed herein, in accordance with some examples.

FIG. 5 is a diagrammatic representation of the machine 500 within which instructions 510 (e.g., software, a program, an application, an applet, an application, or other executable code) for causing the machine 500 to perform any one or more of the methodologies discussed herein may be executed. For example, the instructions 510 may cause the machine 500 to execute any one or more of the methods described herein. The instructions 510 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 510, sequentially or otherwise, that specify actions to be taken by the machine 500. Further, while only a single machine 500 is illustrated, the term "machine" shall also be taken to include a collection of machines that individually or jointly execute the instructions 510 to perform any one or more of the methodologies discussed herein. The machine 500, for example, may comprise the member client device 102 or any one of a number of server devices forming part of the experience analytics server 116. In some examples, the machine 500 may also comprise both client and server systems, with certain operations of a particular method or algorithm being performed on the server-side and with certain operations of the particular method or algorithm being performed on the client-side.

The machine 500 may include processors 504, memory 506, and input/output I/O components 502, which may be configured to communicate with each other via a bus 540. In an example, the processors 504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 508 and a processor 512 that execute the instructions 510. The term "processor" is intended to include multi-core processors that may comprise two or more independent processors (sometimes referred to as "cores") that may execute instructions contemporaneously. Although FIG. 5 shows multiple processors 504, the machine 500 may include a single processor with a single-core, a single processor with multiple cores (e.g., a multi-core processor), multiple processors with a single core, multiple processors with multiples cores, or any combination thereof.

The memory 506 includes a main memory 514, a static memory 516, and a storage unit 518, both accessible to the processors 504 via the bus 540. The main memory 506, the static memory 516, and storage unit 518 store the instructions 510 embodying any one or more of the methodologies or functions described herein. The instructions 510 may also reside, completely or partially, within the main memory 514, within the static memory 516, within machine-readable medium 520 within the storage unit 518, within at least one of the processors 504 (e.g., within the processor's cache memory), or any suitable combination thereof, during execution thereof by the machine 500.

The I/O components 502 may include a wide variety of components to receive input, provide output, produce output, transmit information, exchange information, capture measurements, and so on. The specific I/O components 502 that are included in a particular machine will depend on the type of machine. For example, portable machines such as mobile phones may include a touch input device or other such input mechanisms, while a headless server machine will likely not include such a touch input device. It will be appreciated that the I/O components 502 may include many other components that are not shown in FIG. 5. In various examples, the I/O components 502 may include user output components 526 and user input components 528. The user output components 526 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 502 may include biometric components 530, motion components 532, environmental components 534, or position components 536, among a wide array of other components. For example, the biometric components 530 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 532 include acceleration sensor components (e.g., accelerometer), gravitation sensor components, rotation sensor components (e.g., gyroscope).

The environmental components 534 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 536 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 502 further include communication components 538 operable to couple the machine 500 to a network 522 or devices 524 via respective coupling or connections. For example, the communication components 538 may include a network interface component or another suitable device to interface with the network 522. In further examples, the communication components 538 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 524 may be another machine or any of a wide variety of peripheral devices (e.g., a peripheral device coupled via a USB).

Moreover, the communication components 538 may detect identifiers or include components operable to detect identifiers. For example, the communication components 538 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 538, such as location via Internet Protocol (IP) geolocation, location via Wi-Fi® signal triangulation, location via detecting an NFC beacon signal that may indicate a particular location, and so forth.

The various memories (e.g., main memory 514, static memory 516, and memory of the processors 504) and storage unit 518 may store one or more sets of instructions and data structures (e.g., software) embodying or used by any one or more of the methodologies or functions described herein. These instructions (e.g., the instructions 510), when executed by processors 504, cause various operations to implement the disclosed examples.

The instructions 510 may be transmitted or received over the network 522, using a transmission medium, via a network interface device (e.g., a network interface component included in the communication components 538) and using any one of several well-known transfer protocols (e.g., hypertext transfer protocol (HTTP)). Similarly, the instructions 510 may be transmitted or received using a transmission medium via a coupling (e.g., a peer-to-peer coupling) to the devices 524.

Software Architecture

Figure 6:
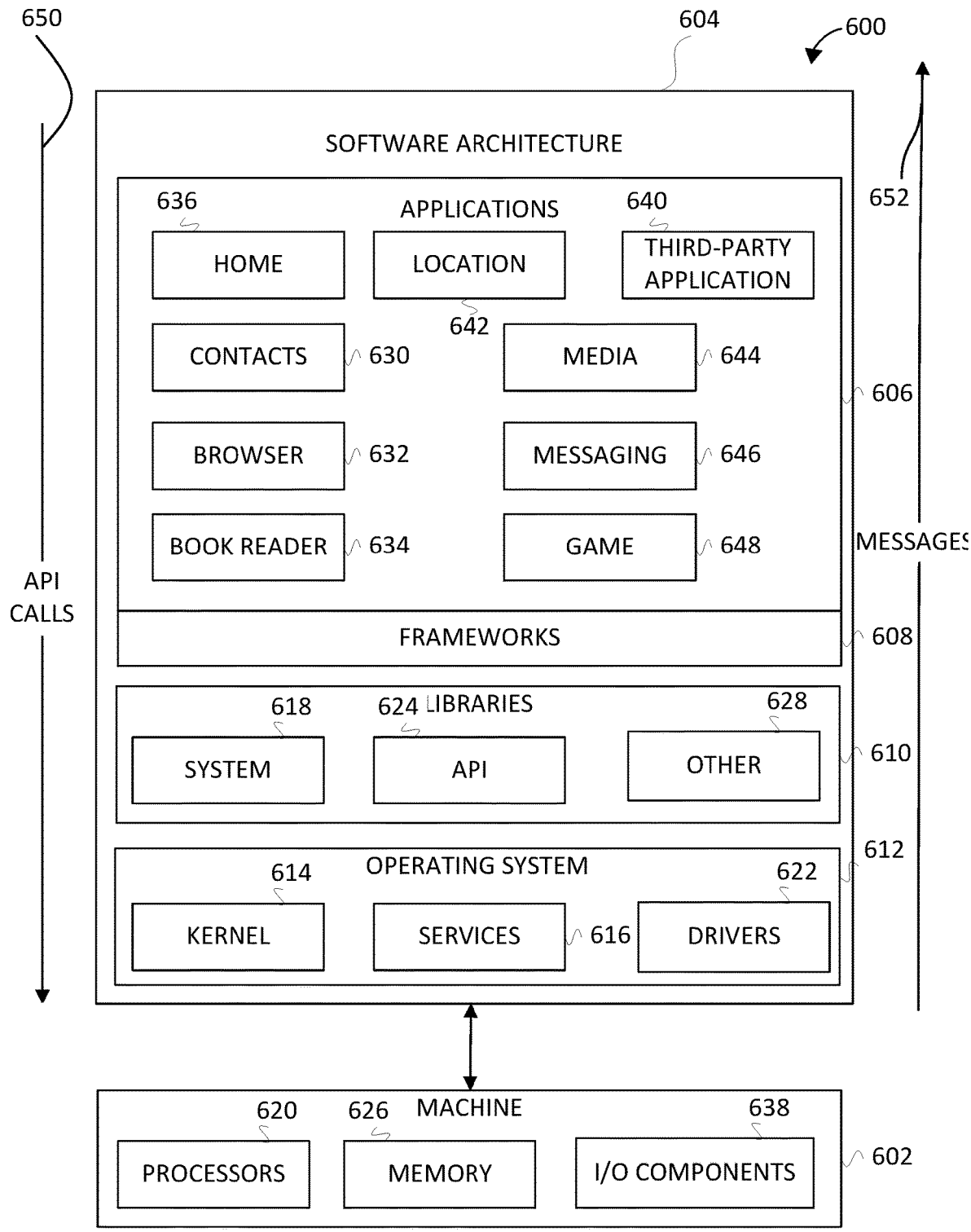
FIG. 6 is a block diagram showing a software architecture within which examples may be implemented.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionalities. The services 616 can provide other common services for the other software layers. The drivers 622 are responsible for controlling or interfacing with the underlying hardware. For instance, the drivers 622 can include display drivers, camera drivers, BLUETOOTH® or BLU- ETOOTH® Low Energy drivers, flash memory drivers, serial communication drivers (e.g., USB drivers), WI-FI® drivers, audio drivers, power management drivers, and so forth.

The libraries 610 provide a common low-level infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a common high-level infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example, the applications 606 may include a home application 636, a contacts application 630, a browser application 632, a book reader application 634, a location application 642, a media application 644, a messaging application 646, a game application 648, and a broad assortment of other applications such as a third-party application 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 650 provided by the operating system 612 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A computer-implemented method, comprising:
generating, for each of a first plurality of sessions, a session representation indicating an order through which a user navigated through a plurality of webpages during the session;
generating a plurality of clusters by clustering the session representations based on similarity between session representations, the plurality of clusters comprising an optimal number of clusters based on key performance indicators corresponding to each cluster of the plurality of clusters;
generating, for each of a second plurality of sessions, a session representation indicating an order through which a user navigated through a plurality of webpages during the session;
determining a medoid of each of the plurality of clusters; and
for each session representation generated for each of the second plurality of sessions, performing operations comprising:
computing a distance between the session representation and each medoid to determine a nearest medoid; and
assigning the session representation to a cluster associated with the nearest medoid.

2. The computer-implemented method of claim 1, wherein the medoid of each of the plurality of clusters is a session representation that has a least sum distance with the session representations in a respective cluster.

3. The computer-implemented method of claim 1, further comprising:
generating a natural language description for each cluster of the plurality of clusters based on the key performance indicators associated with each cluster.

4. The computer-implemented method of claim 1, wherein the first plurality of sessions and a second plurality of sessions are subsets of a third plurality of sessions.

5. The computer-implemented method of claim 1, wherein the second plurality of sessions comprises new sessions generated after the first plurality of sessions was generated and the plurality of clusters was generated.

6. The computer-implemented method of claim 1, wherein the session representation is a string based on a semantic categorization of the plurality of webpages.

7. The computer-implemented method of claim 1, wherein the similarity between session representations is determined based on a similarity score for each pair of session representations.

8. The computer-implemented method of claim 7, wherein the similarity score is generated based on a cost of character change, a cost of insertion, a cost of deletion, and a cost of starting a gap.

9. The computer-implemented method of claim 8, wherein the cost of a character change is higher than a cost of an insertion or deletion.

10. The computer-implemented method of claim 1, wherein key performance indicators comprise at least two of an interaction time with each of a page category, a conversion rate, a frustration score indicating a level of frustration of a user, or a goal set by an entity associated with a website corresponding to the plurality of webpages.

11. The computer-implemented method of claim 1, wherein determining the optimal number of clusters based on the key performance indicators corresponding to each cluster of the plurality of clusters comprises:
computing, for each pair of clusters and a key performance indicator of a plurality of key performance indicators, a value indicating a comparison of distributions of the key performance indicator between each cluster in the pair;
computing, for each cluster, a key performance indicator cluster index for each key performance indicator, the key performance indicator cluster index indicating how a cluster corresponds to each key performance indicator;
computing, for each cluster, a multiple key performance indicators cluster index based on the key performance indicator cluster index for each key performance indicator;
computing, for each cluster, an overall index value based on a sum of the multiple key performance indicators cluster index for each cluster; and
selecting the optimal number of clusters based on the overall index value.

12. The computer-implemented method of claim 11, wherein selecting the optimal number of clusters based on the overall index value comprises:
computing scores for a predefined number of clusters by computing a score for each number of clusters in a predefined range, the score indicating an increase in value for a given number of clusters from a previous number of clusters, using the overall index value;
identifying a maximum score of the computed scores; and
selecting a number of clusters with the maximum score as the optimal number of clusters.

13. The computer-implemented method of claim 1, further comprising:
generating a longest common subsequence shared between session representations in each cluster and a percentage of sessions within the cluster that share the longest common subsequence.

14. The computer-implemented method of claim 1, further comprising:
selecting one or more session representations for each cluster as prototypical session representations for the cluster.

15. The computer-implemented method of claim 3, wherein generating the natural language description for each cluster of the optimal number of clusters based on the key performance indicators associated with each cluster further comprises generating a comparison of the key performance indicators for the cluster compared to all clusters.

16. A computing system comprising:
a processor; and
a memory storing instructions that, when executed by the processor, configure the computing system to perform operations comprising:
generating, for each of a first plurality of sessions, a session representation indicating an order through which a user navigated through a plurality of webpages during the session;
generating a plurality of clusters by clustering the session representations based on similarity between session representations, the plurality of clusters comprising an optimal number of clusters based on key performance indicators corresponding to each cluster of the plurality of clusters;

generating, for each of a second plurality of sessions, a session representation indicating an order through which a user navigated through a plurality of webpages during the session;

determining a medoid of each of the plurality of clusters; and for each session representation generated for each of the second plurality of sessions, performing operations comprising:

computing a distance between the session representation and each medoid to determine a nearest medoid; and assigning the session representation to a cluster associated with the nearest medoid.

17. The computing system of claim 16, wherein the medoid of each of the plurality of clusters is a session representation that has a least sum distance with the session representations in a respective cluster.

18. The computing system of claim 16, wherein the first plurality of sessions and a second plurality of sessions are subsets of a third plurality of sessions.

19. The computing system of claim 16, wherein the second plurality of sessions comprises new sessions generated after the first plurality of sessions was generated and the plurality of clusters was generated.

20. A non-transitory computer-readable storage medium including instructions that, when processed by a computer, configure the computer to perform operations comprising:

generating, for each of a first plurality of sessions, a session representation indicating an order through which a user navigated through a plurality of webpages during the session;

generating a plurality of clusters by clustering the session representations based on similarity between session representations, the plurality of clusters comprising an optimal number of clusters based on key performance indicators corresponding to each cluster of the plurality of clusters;

generating, for each of a second plurality of sessions, a session representation indicating an order through which a user navigated through a plurality of webpages during the session;

determining a medoid of each of the plurality of clusters; and for each session representation generated for each of the second plurality of sessions, performing operations comprising:

computing a distance between the session representation and each medoid to determine a nearest medoid; and assigning the session representation to a cluster associated with the nearest medoid.

* * * * *

UNITED STATES PATENT AND TRADEMARK OFFICE
CERTIFICATE OF CORRECTION

PATENT NO. : 11,960,553 B1
APPLICATION NO. : 18/383534
DATED : April 16, 2024
INVENTOR(S) : Loghmani et al.

It is certified that error appears in the above-identified patent and that said Letters Patent is hereby corrected as shown below:

In the Specification

In Column 11, Line 26, delete "$p_{kpi_k,ij}$" and insert --$p_{kpi_k,i,j}$-- therefor In Column 11, Line 35, delete "$\text{index}_{kpi_k}(\text{cluster}_i) = \text{geoMean}_{1 \leq j \leq n_i, j \neq i}(-\log_{10}(p_{kpi_k,ij}))$" and insert --$\text{index}_{kpi_k}(cluster_i) = geoMean_{1 \leq j \leq n_i, j \neq i}(-log_{10}(p_{kpi_k,i,j}))$-- therefor In Column 11, Line 55, delete "$\text{index}(\text{cluter}_i) = \text{mean}_k(\text{index}_{kpi_k}(\text{cluster}_i))$" and insert --$index(cluster_i) = mean_k(index_{kpi_k}(cluster_i))$-- therefor In Column 16, Line 7, delete "I/O" and insert --(I/O)-- therefor In Column 16, Line 30, delete "506," and insert --514,-- therefor Signed and Sealed this
Twenty-fifth Day of November, 2025

John A. Squires
*Director of the United States Patent and Trademark Office*